Patented Apr. 8, 1947

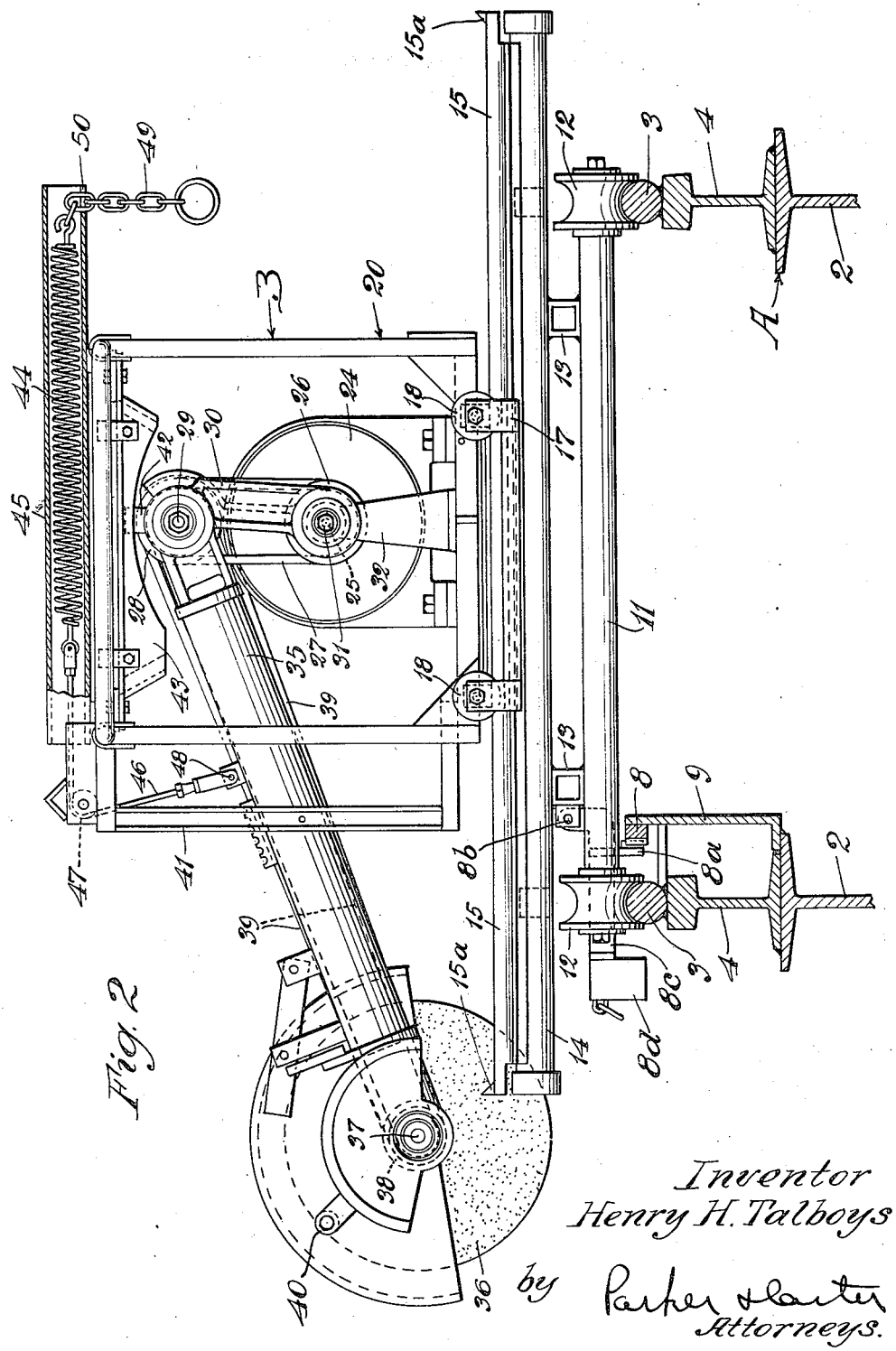

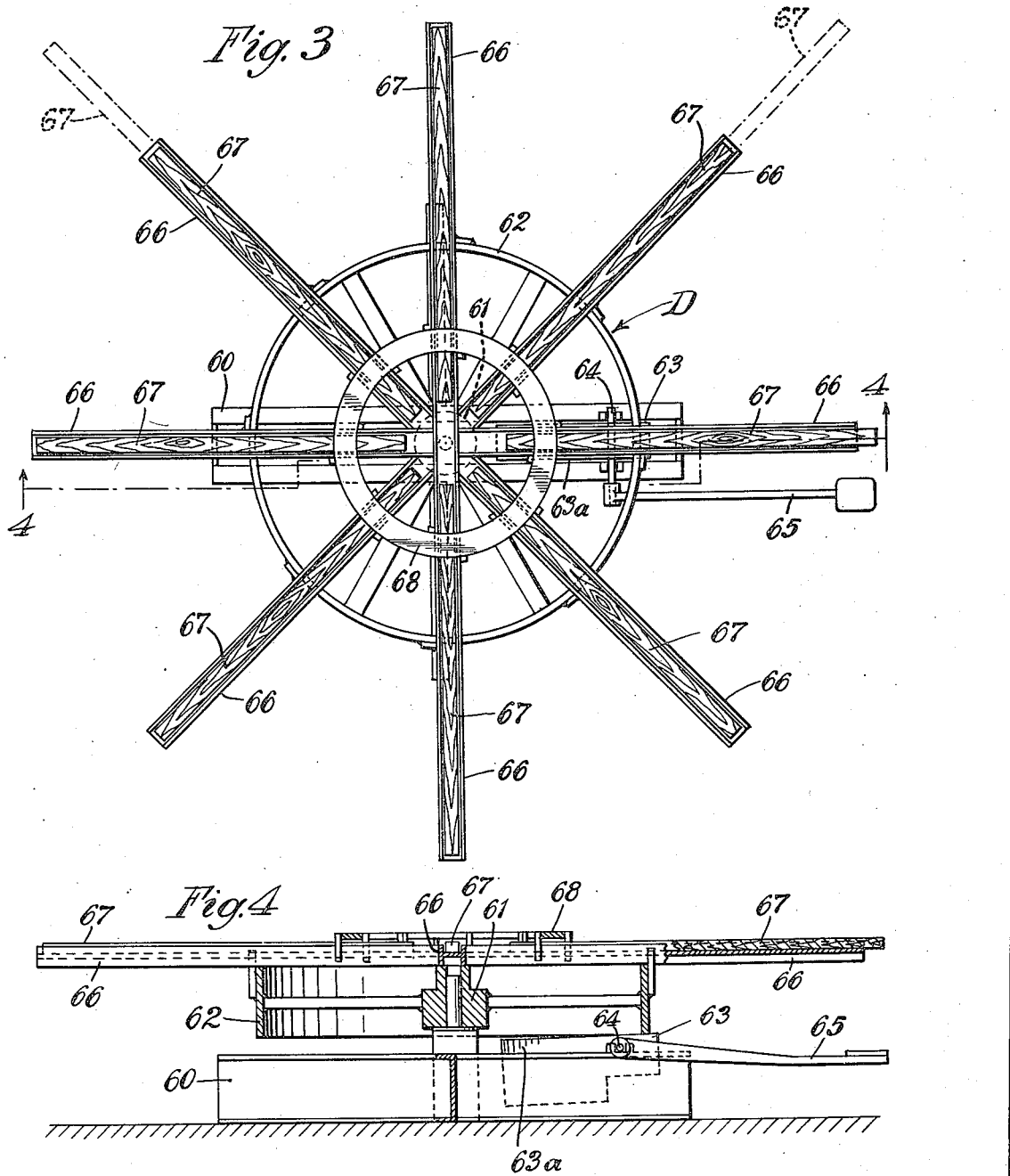

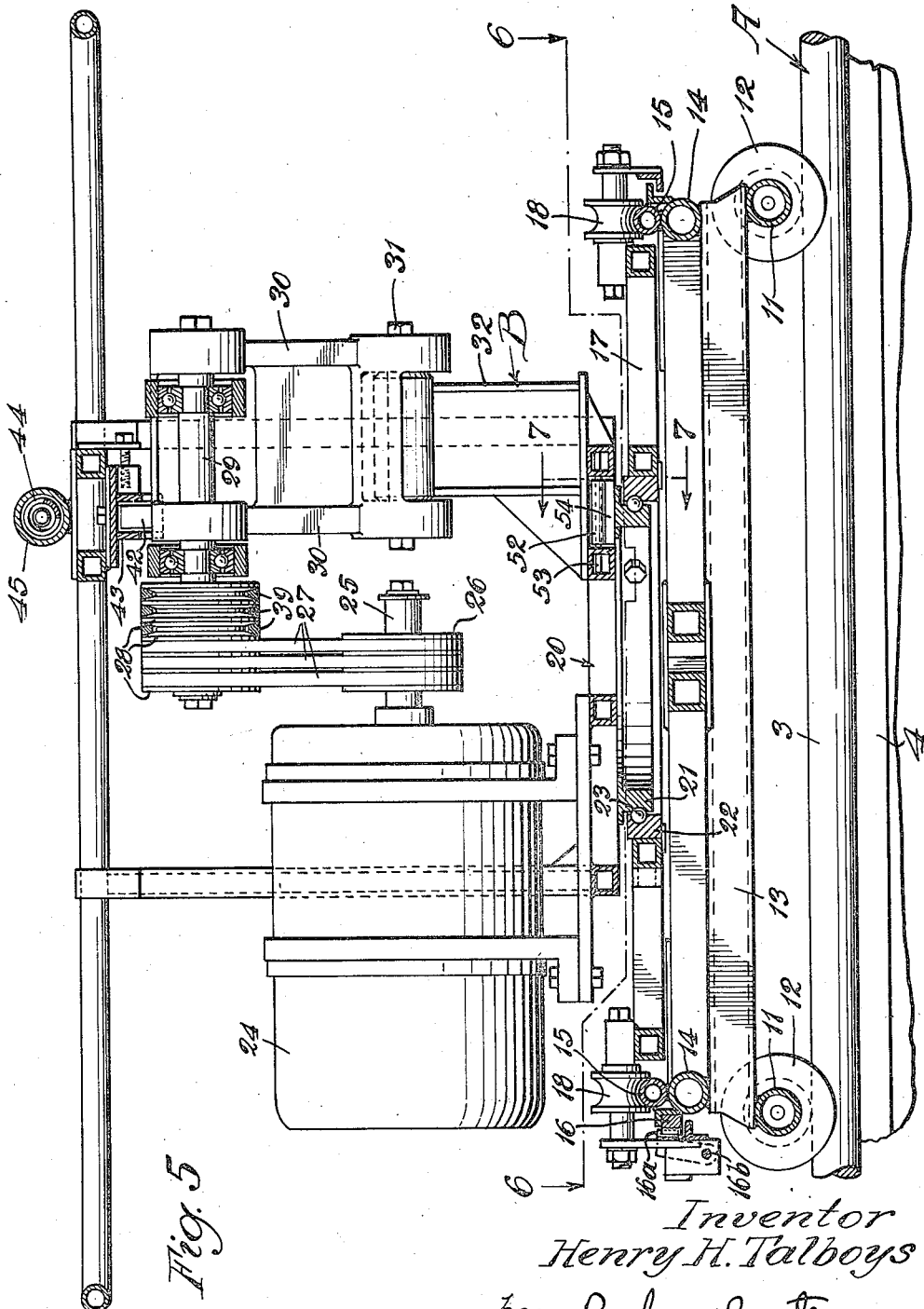

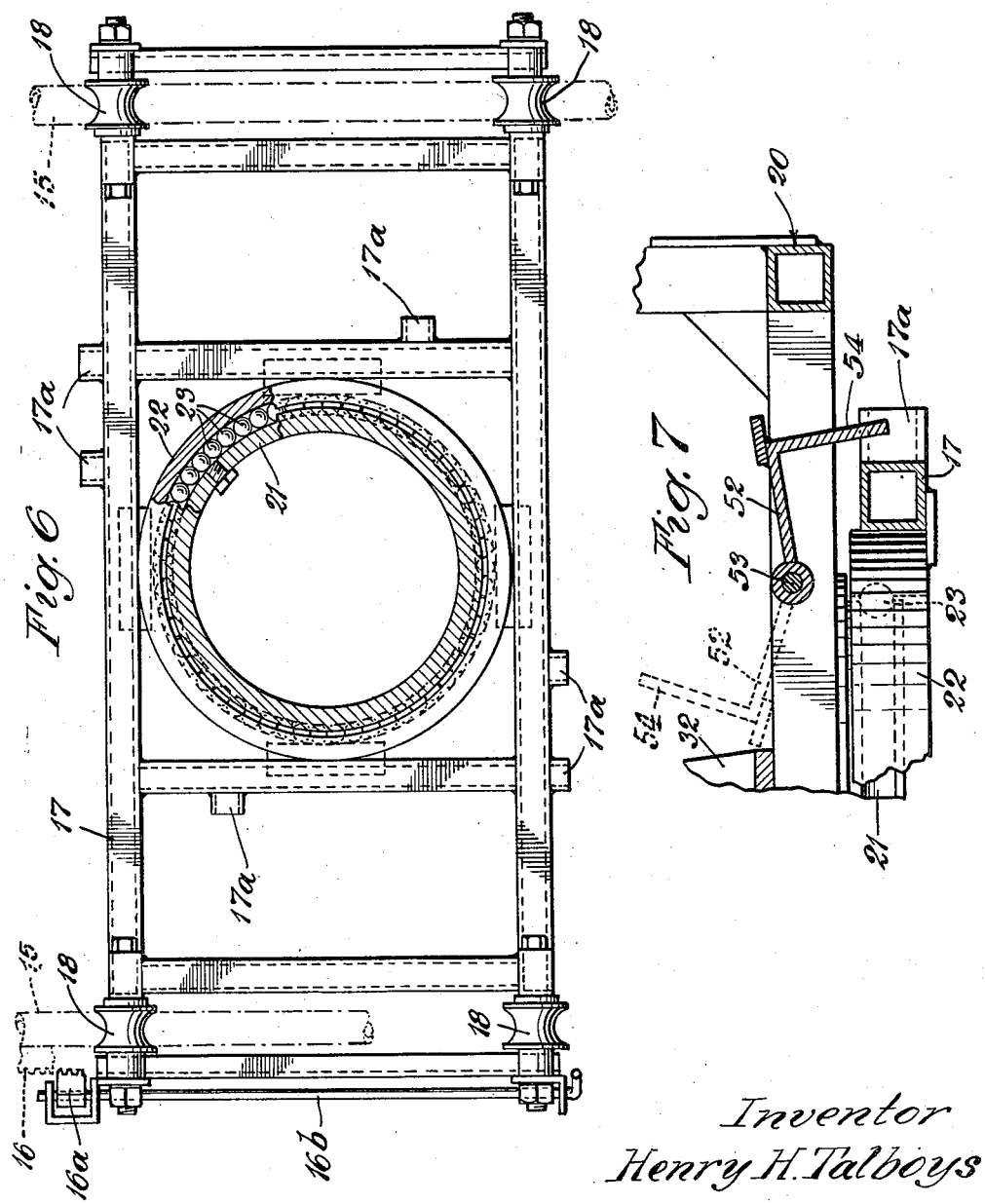

2,418,737

UNITED STATES PATENT OFFICE 2,418,737

FOUNDRY CUTOFF MACHINE

Henry H. Talboys, Milwaukee, Wis., assignor to Nordberg Manufacturing Company, Milwaukee, Wis., a corporation of Wisconsin Original application January 28, 1943, Serial No. 473,812, now Patent No. 2,405,468, dated August 6, 1946. Divided and this application February 5, 1945, Serial No. 576,186

8 Claims. (Cl. 51—98)

This invention relates to an improvement in machines for cutting articles, for example, metal castings.

Another purpose of the invention is an improved method for trimming and cutting articles, for example metal castings.

Another purpose is to provide an improved installation for cutting or trimming articles, such as castings, of various sizes and shapes with maximum speed and minimum handling effort.

Another purpose is to provide a flexible system and method for cutting or trimming articles of a variety of shapes.

Other purposes will appear from time to time throughout the specification and claims.

The present application is a division of my co-pending application Serial Number 473,812, filed January 28, 1943, for Foundry cutoff machine, which matured as Patent No. 2,405,468, August 6, 1946.

The invention is illustrated more or less diagrammatically in the accompanying drawings, wherein—

Figure 2 is a side elevation with parts in section;

Figure 3 is a plan view of part of the structure shown in Figure 1;

Figure 4 is a section on the line 4—4 of Figure 3;

Figure 5 is a vertical section, on an enlarged scale, through the movable carriage;

Figure 6 is a section on the line 6—6 of Fig. 5; and

Figure 7 is a partial section, on a somewhat enlarged scale, on the line 7—7 of Fig. 5.

Like parts are indicated by like characters throughout the specification and drawings.

Figure 1:
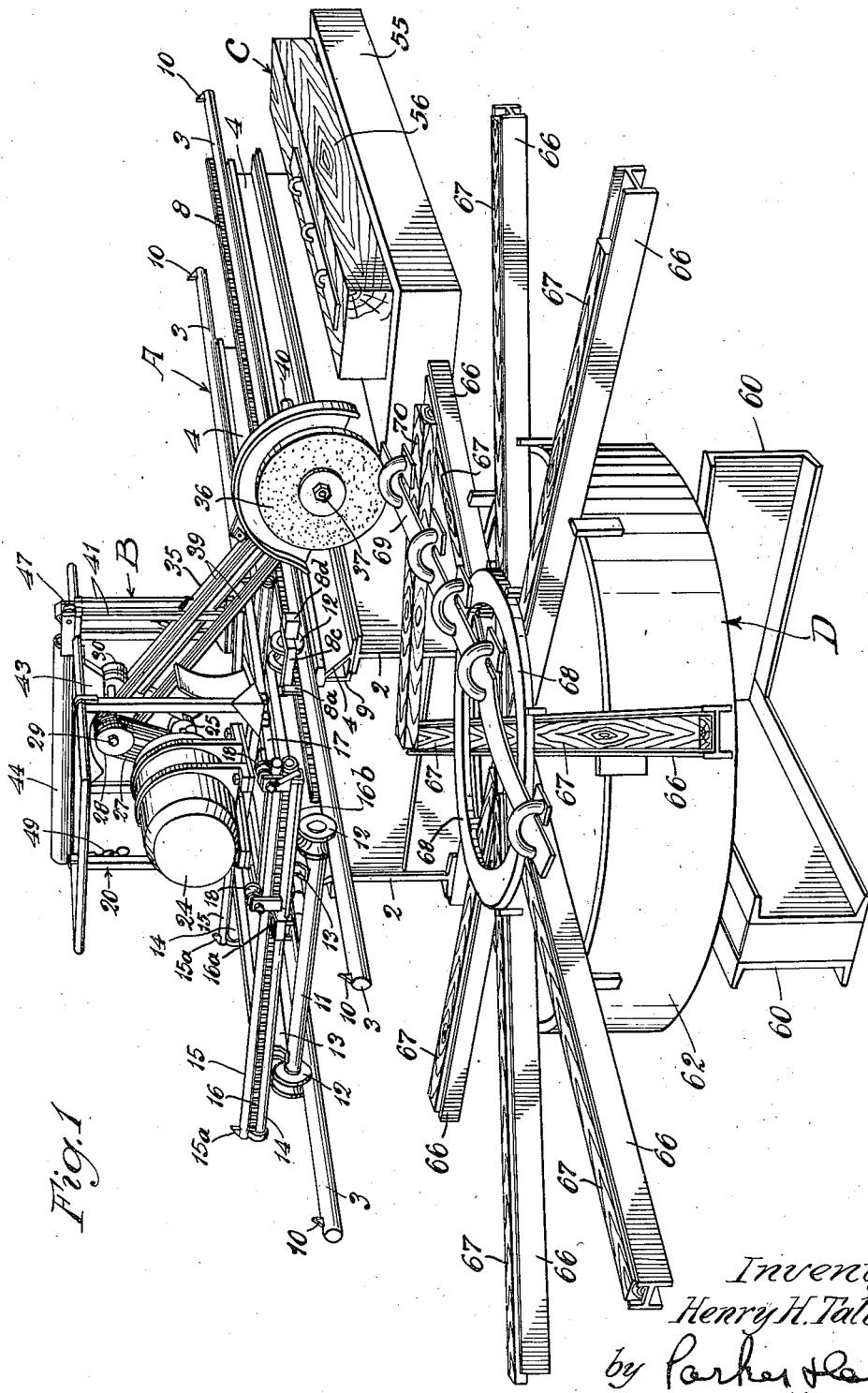
Figure 1 is a perspective view.

Referring to the drawings, and particularly Figures 1 and 2, a structure is illustrated including the main parts as follows:

A generally indicates a supporting base. B generally indicates a carriage and cutter assembly longitudinally movable along the base A. C indicates a work support exterior to the base A, and D indicates a second work support exterior to the base A, and located adjacent and beyond one end of the base A.

Referring first to the base or assembly A, which is described in considerable detail in my co-pending application Serial No. 473,812, it will be understood that it may have any suitable bottom portion or floor along which are shown as extending, a pair of parallel I-beams 2, 2. The I-beams carry on their upper flanges any suitable work supporting rails 3, 3, herein shown as round and as mounted upon any suitable conventional rails 4. It will be understood, of course, that any suitable rails may be employed but the round rails mounted on the conventional I-shaped rails are in practice satisfactory.

It will be observed that the I-beams 2 are of sufficient height to permit pieces of substantial size to be positioned between them for accessibility to the cutting device which will later be described. However, since such supporting means within the base are described and claimed in said above-mentioned co-pending application Serial No. 473,812, they are not herein indicated.

A rack 8 is shown as extending along one of the rails 3 and may be mounted, for example on a longitudinally extending element 9, suitably secured to one of the lower rails 4, or to an upper portion of one of the side frame members or I-beams 2. 10 indicate any proper end stops as shown in Figure 1 at each end of the round rails 3.

The structure generally indicated at B includes a carriage which is longitudinally movable along the rails 3 and a sub-carriage, transversely movable on the longitudinal carriage, a turntable rotated about a vertical axis on the sub-carriage and a cutter movably mounted on the turntable. The structure will now be described in greater detail.

The details of the carriage do not of themselves form part of the present invention. There are illustrated for example transversely extending frame elements 11, carrying at each end flanged wheels 12, appropriately formed to ride and move upon the round rails 3. Any suitable longitudinal extending frame members 13 may be employed which carry any suitable transversely extending cross frame members 14 and transversely extending tracks 15 having stop members 15a at each end. The main carriage may otherwise be strengthened by any intermediate members which do not form part of the present invention.

Adjacent each of the frame members 14 is a transversely extending track 15. Riding transversely on the tracks 15 is a sub-carriage, the frame of which is generally indicated as at 17. It carries in any suitable manner flanged wheels 18 riding on the tracks 15.

Rotatably mounted on said sub-carriage is a turntable structure generally indicated as 20, mounted for rotation about a vertical axis by any suitable means, for example, upon inner circular rails 21, outer circular rails 22 and the intervening rollers or balls 23. Mounted on the turntable is any suitable motor 24 which may be electric or otherwise but is herein shown as electric. Its rotor shaft 25 carries one or more pulley or pulleys 26 about which pass the belt or belts 27 to the driven pulleys 28. These pulleys are mounted on a shaft 29 which is rotatably mounted at the upper end of the connected links 30. These links are rotatable about an axis generally indicated at 31 which is preferably concentric with the axis of rotation of the rotor shaft 25.

32 indicates generally any suitable support, upwardly extending from the turntable structure 20, upon which the links 30 are rotatably positioned.

Rotatably mounted in any suitable manner in relation to the shaft 29 is the outwardly extending arm 35 upon the outer end of which is rotatably mounted any suitable cutting disk 36, rotatable with the shaft 37, which is rotated by means of a pulley 38, belts 39, and the pulley or pulleys 28. It will be understood that there is thus provided a flexible supporting means for the cutting element 36. The outer end of the arm 35 can be raised and lowered by rotating it about the shaft 29. The shaft 29 is itself mounted in the pivoted links 30 so that the arm 35 may be moved transversely, giving a great freedom of motion to the element. Any suitable manual handle 40 may be employed whereby the operator may radially manipulate the arm 35. The vertical movement of the arm 35 is guided by a pair of laterally spaced vertical frame members 41. The links 30 are guided in their rotary movement by an upward extension 42 which rides in an arcuate channel 43. The arm 35 is normally held in elevated position by means of a coil spring 44 in a tube 45. Connecting the coil spring with the arm is any suitable cable or flexible tension member 46 herein shown as passing around a sheave or pulley 47 and connected to the arm 35 as at 48. The strength of the raising impulse can be adjusted by means of the adjusting chain 49 secured to the opposite end of the spring 44 and which can be engaged at various positions in a slot 50 in the bottom of the outer end of the tube 45.

Any suitable means may be employed for locking the turntable at any desired position in relation to the sub-carriage, or if desired, the turntable may be permitted to rotate freely preferably with sufficient frictional resistance so that unintended rotation will not take place. As a locking means, there is illustrated for example a locking latch or lever 52 pivoted as at 53 to the turntable structure 20 and having a dependent end 54 adapted to penetrate between any suitable securing abutments 17a on the sub-carriage 17.

The sub-carriage is adjustable transversely across the rails in relation to the main carriage by means of the wheels 18, and rails 15 but it is generally desirable to lock the sub-carriage in relation to the main carriage. This locking action may be obtained for example by any suitable toothed securing dog 16a, pivoted as at 16b on the sub-carriage 17 and engageable with the rack 16, on the main carriage. Thus the sub-carriage may be locked at any desired position in relation to the main carriage or if desired the dog 16a may be left in released position.

The main carriage may be locked at any point along the rails 3 by means of a toothed latch 8a pivoted as at 8b on the main frame. 8c is an arm carrying a counterweight 8d which normally urges the member 8a into locking relationship with the member 8. Any suitable means may be provided for raising the arm 8c and releasing the carriage for movement along the rails 3.

In many instances, it is desirable to support the work exteriorly to the space defined by the side frame elements 2, 2. In Figure 1, normally fixed exterior supporting means are illustrated. 55 indicates a base upon which an upper support 56 is mounted. The support 56 may be formed of any suitable shape and size and may for example be of wood so that the cutter 36 will not be injured when it passes through metal objects laid thereon.

It may also be desirable to provide movable supporting means D for supporting one or more work pieces which may be presented to the cutter 36 at a variety of angles or positions. As shown for example in Figures 3 and 4 and 1, there is illustrated any suitable base 60 upon which is rotatable about a vertical axis a hub 61 carrying any suitable wheel or arm supporting structure 62. This movement may be controlled for example by a foot brake which includes a member 63 pivoted at 64 on the base 60 and normally gravitally urged into braking relationship with the wheel 62 by its inward extension 63a. 65 is any suitable foot lever whereby the brake may be moved into inoperative position. Generally radially extending from the hub 61 and mounted upon the wheel 62 are a plurality of channel members 66. Radially movable in these channel members are the radially extending elements 67, which if desired, may be of wood. They may be held against radial movement if desired or frictional resistance may be relied upon. It is desirable, however, to have the members 67 radially movable so that the effective radius of the rotary supporting table may be varied at will. The members 67 are preferably of wood and preferably extend above the edges of the channel 66, in order to prevent the cutter 36 from engaging the channels 66 after passing through the work. Any suitable central supporting ring 68 may also be employed if need be. 69 indicates typical work piece. It will be understood that the work pieces may be supported on the extension members 67 in any suitable manner. Cross pieces 70 may, for example, be loosely positioned in order to support the work, or the work may extend across to adjacent radial supports.

It will be understood that a plurality of work pieces if desired may be positioned on the rotary support above described and may be moved into the working zone where they can be reached by the cutter 36. If desired, a step by step feeding chain may be set up, the work being positioned on the turntable and progressively moved step by step into the cutting zone and then removed from the turntable after having been rotated beyond the cutting position. In any event, the fact that the work support may be rotated, taken in connection with the extensible adjustment of the member 67 and the adjustment of the main carriage, the sub-carriage and the turntable of the cutting device permits an adaptation of the device to cutting and trimming work pieces of a wide variety of sizes and shapes. If desired, more than one of the supports 55, 56 may be employed, for example they may be positioned at each side of the base members 2 or two or more of the rotary supports may be employed. But the combination shown in Figure 1 is practical and useful and permits a single cutting apparatus to operate in the base as defined by the members 2 and along one side and one end of the base area.

Broadly stated, it is practical to position work within and all the way around the exterior of the base area and because of the adjustability of the main carriage, the sub-carriage and the turntable, the work may be operated upon throughout said area. This is advantageous and a saving of labor and time as the work for example can be deposited at one side of the frame while work already deposited in working position is being operated on at the other side of the frame. A relatively small gang of men can thus operate rapidly upon a large mass of material.

A practical application of the device and method is to trim castings by cutting off gates, fins, etc., and in general trimming off waste portions of the metal and separating different parts of the castings where separation is desired.

It will be realized that while I have shown and described an operating device, still many changes in size, shape, arrangement, number and disposition of the parts may be made without departing materially from the spirit of my invention. I wish, therefore, that the showing herein be taken as in a large sense illustrative and diagrammatic rather than limiting me to the precise showing.

The use and operation of my invention are as follows:

There is provided herein a method of and an apparatus for trimming or cutting metal parts, for example, castings, which permits of the rapid trimming of a large number of parts and the use of a substantial area for the receiving, operating upon and removal of the trimmed parts.

In the structure herein disclosed, there is illustrated a practical exemplification of the device and an illustration of the mechanism adapted for carrying out the above mentioned method in which the main carriage, and all the parts mounted thereon, is longitudinally movable or adjustable along a work area. This permits the cutter to adapt itself or to be opposed to parts located throughout a very substantial floor area. The transverse adjustability of the main carriage and the sub-carriage and the provision of a turntable with the cutting member movably mounted on it, permits wide variations of the angle of approach of the cutter to the work. This, in connection with a highly flexible supporting means and method, enables a single cutter operated by a single man to operate upon a very large volume of work.

As is clear from Figure 1, the cutting element may be opposed to castings positioned within the base A or upon either of the outside bases. The rotary structure of Figures 3 and 4 may carry a large number of castings and may be moved step by step through any suitable zone of access within the range of movement of the cutter 36. By use of the member 40, the cutter may be vertically moved in relation to the casting or may be traversed across the casting. Or the cut may be obtained by a combination of the two movements.

I claim:

1. In a castings trimmer, a base, a carriage, means for guiding it for generally horizontal movement along said base, a turn table on said carriage rotatable about a generally vertical axis, an arm on said turntable rotatable about a generally horizontal axis, a rotary cutter mounted adjacent the outer end of the arm and means for rotating it, and castings supporting means positioned adjacent the base, located laterally out of line with the path of movement of the carriage, but within the radius of movement of the arm, said supporting means including a turntable upon which castings may be positioned, said turntable having radially extending radially adjustable supporting elements.

2. In a castings trimmer, a base, a carriage, means for guiding it for generally horizontal movement along said base, a turntable on said carriage rotatable about a generally vertical axis, an arm on said turntable rotatable about a generally horizontal axis, a rotary cutter mounted adjacent the outer end of the arm and means for rotating it, and castings supporting means positioned adjacent the base, located laterally out of line with the path of movement of the carriage, but within the radius of movement of the arm, said supporting means including a turntable upon which castings may be positioned and means for controlling the rotation of said turn table, including a brake and means for normally holding it in braking position.

3. In a castings trimmer, a base, a carriage, means for guiding it for generally horizontal movement along said base, a turn table on said carriage rotatable about a generally vertical axis, an arm on said turn table rotatable about a generally horizontal axis, a rotary cutter mounted adjacent the outer end of the arm and means for rotating it, and castings supporting means positioned adjacent the base, located laterally out of line with the path of movement of the carriage, but within the radius of movement of the arm, said supporting means including a turn table upon which castings may be positioned and means for controlling the rotation of said turn table, including a brake and means for normally holding it in braking position and brake releasing means including a foot pedal.

4. In a castings trimmer, a castings supporting base including a supporting member rotatable about a generally vertical axis, said member being adapted to support castings of various shapes and sizes, at various distances from the center of rotation of the member, a castings cutter assembly including a base, a trimmer arm mounted on said base, for ready rotation, in relation to said base, about both a generally horizontal and a generally vertical axis, said arm being additionally freely movable endwise, and a cutting member rotatably mounted on said arm and means for rotating the cutting member, the upper surface of said supporting member, and of the articles positioned thereupon, being freely accessible to said cutting member throughout a substantial radial zone.

5. In a castings trimmer, a castings supporting base including a supporting member rotatable about a generally vertical axis, said member being adapted to support castings of various shapes and sizes, at various distances from the center of rotation of the member, a castings cutter assembly including a base, a trimmer arm mounted on said base, for ready rotation, in relation to said base, about both a generally horizontal and a generally vertical axis, said arm being additionally freely movable endwise, and a cutting member rotatably mounted on said arm and means for rotating the cutting member, the upper surface of said supporting member, and of the articles positioned thereupon, being freely accessible to said cutting member throughout a substantial radial zone, and means for normally holding said supporting member against rotation.

6. In a castings trimmer, a castings supporting base including a supporting member rotatable about a generally vertical axis, said member being adapted to support castings of various shapes and sizes, at various distances from the center of rotation of the member, a castings cutter assembly including a base, a trimmer arm mounted on said base, for ready rotation, in relation to said base, about both a generally horizontal and a generally vertical axis, said arm being additionally freely movable endwise, and a cutting member rotatably mounted on said arm and means for rotating the cutting member, the upper surface of said supporting member, and of the articles positioned thereupon, being freely accessible to said cutting member throughout a substantial radial zone, and means for normally holding said supporting member against rotation, and means, operable by the user, for releasing said holding means and for permitting rotation of the supporting member.

7. In a castings trimmer, a base, a castings trimmer assembly mounted on said base, said assembly being rotatable bodily about said base, and being located radially outwardly from the center about which it is rotated, said assembly including a carriage movable toward and away from the center about which said unit is rotated, an arm mounted on said carriage for ready rotation about a generally horizontal and a generally vertical axis, and being additionally freely movable endwise, a cutting member rotated on said arm and means for rotating the cutting member.

8. In a castings trimmer, a castings supporting base including a supporting member rotatable about a generally vertical axis, said member being adapted to support castings of various shapes and sizes at various distances from the center of rotation of the member, a castings cutter assembly including a base, a turn table on said base, rotatable about a generally vertical axis, a trimmer arm mounted on said turn table for ready rotation in relation to said turn table about a generally horizontal axis, said arm being additionally freely movable endwise, a cutting member rotatably mounted on said arm and means for rotating the cutting member, the length of said arm, in relation to the distance between the axes of the supporting member and of the turn table, being sufficient to permit the cutting member to reach articles positioned upon the supporting member throughout a zone extending from adjacent the center to the periphery of the cutting member, the upper surfaces of the supporting member and the articles positioned thereupon, being freely accessible, from above, to said cutting member.

HENRY H. TALBOYS.

REFERENCES CITED

The following references are of record in the file of this patent:

UNITED STATES PATENTS

| Number | Name | Date |
|---|---|---|
| 453,297 | Watrous | June 2, 1891 |
| 2,195,108 | Graff | Mar. 26, 1940 |
| 1,640,832 | Jacobowitz | Aug. 30, 1927 |
| 1,909,001 | Nelson | May 16, 1933 |
| 2,187,299 | Burkhardt | Jan. 16, 1940 |

FOREIGN PATENTS

| Number | Country | Date |
|---|---|---|
| 16,010 | British | July 19, 1904 |